United States Patent [19]

Schlossberg

[11] 4,280,135
[45] Jul. 21, 1981

[54] REMOTE POINTING SYSTEM

[76] Inventor: Howard R. Schlossberg, 4811 Hercules Ct., Annandale, Va. 22003

[21] Appl. No.: 44,813

[22] Filed: Jun. 1, 1979

[51] Int. Cl.³ ............................................. H04N 7/18
[52] U.S. Cl. ...................................... 358/93; 178/18
[58] Field of Search ......................... 358/93, 183, 107; 340/707, 708, 716, 721, 734; 178/18, 19; 35/25

[56] References Cited

U.S. PATENT DOCUMENTS

| | | | |
|---|---|---|---|
| 3,613,066 | 10/1971 | Cooreman | 178/18 |
| 3,706,850 | 12/1972 | Fisher et al. | 178/18 |
| 3,912,860 | 10/1975 | Sasabe et al. | 178/18 |
| 3,996,674 | 12/1976 | Pardes et al. | 35/25 |
| 4,150,285 | 4/1979 | Brienza et al. | 358/107 |

OTHER PUBLICATIONS

Davey–Modems–Proc. IEEE vol. 60, Nov. 1972.

Primary Examiner—Joseph A. Orsino, Jr.
Attorney, Agent, or Firm—Donald J. Singer; Jacob N. Erlich

[57] ABSTRACT

A remote pointing system which permits the remote positioning of a laser beam in accordance with signals received from a laser beam situated at another location. These signals are derived through the use of an appropriate filter, television camera, pair of counters and modem located at the transmitting location and a telephone receiver, modem, microcomputer, pair of analog to digital converters and suitable beam directing means at the remote or receiving location. By interconnecting the above-mentioned elements by way of a telephone line and proper interfacing of electronics, positioning of the remote laser beam can be accurately and reliably accomplished.

9 Claims, 3 Drawing Figures

REMOTE POINTING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to visual displays, and, more particularly to a pointer capable of being used at remote locations in conjunction with a viewgraph presentation or the like in which the necessity of the briefer being present at the remote location is eliminated.

The use of visual display systems, and in particular, viewgraph presentations in which particular portions of the viewgraph are to be denoted by the briefer is having increasing significance in both military and non-military applications. Unfortunately, such a presentation results in sizeable costs in travel and man hours in order to provide for the briefer to be present during this visual presentation. Since in many instances the visual presentation forms only a small portion, timewise, of the entire presentation, justification cannot be made for the briefers travel.

Unfortunately, the visual presentation, to be properly understood, often requires the use of a pointer, with the actual physical presence of the briefer being generally required for the proper utilization of the pointer during the presentation. Other portions of the presentation can be successfully accomplished by conference call or the like. Therefore, it is essential for the best utilization of time, personnel and equipment that a remote pointing system be developed for use with such visual presentations, that is, a pointing system that does not require the presence of the briefer at the remote location.

SUMMARY OF THE INVENTION

The instant invention sets forth a pointing system which does not require the presence of the briefer and is capable of utilization in conjunction with a visual presentation at a remote location, thereby overcoming the problems encountered in the past and as set forth hereinabove.

The utilization of the remote pointing system of this invention requires, prior to delivery of the visual presentation, the briefer to forward to the remote location one set of two sets of identical viewgraphs. The delivery of the presentation can then be accomplished at the location of the briefer (hereinafter called the transmitting location) which is linked to the remote location (hereinafter called the receiving location) by normal linkage through conventional conference telephone equipment so that the briefer can be heard in the remote location. The two sets of identical viewgraphs are shown simultaneously at the transmitting location and receiving location. Synchronization of the showing of the viewgraphs is accomplished in a conventional manner (such as by voice communication or buzzer) through use of the conference link.

The instant invention is designed for utilization with the arrangement set forth hereinabove by providing a pointing system which incorporates therein a pair of pointers. One pointer, located at the transmitting station, is used by the briefer while the other pointer is located at the receiving location. The pointers are coordinated with the viewgraph presentation without the actual presence of the briefer being necessary. In addition, the pointing system of this invention has the capability of requiring only a normal telephone line, or, could, if desirable, use some of the bandwidth of the conference call line.

Each pointer is generally in the form of a small handheld-type laser operating at a preselected wavelength and is utilized at the transmitting location in a similar manner to a conventional light pointer. Located in the room with a projection screen and optically aligned therewith, is a conventional television pick-up device (a vidicon camera, for example) having an optical filter interposed between the screen and the television pick-up capable of passing therethrough only the very narrow band of the preselected laser wavelength. Thus, the television pick-up device develops a large output signal when its scan position is at the image of the laser pointer spot position. The position of the scan at the time of the large video output signal due to the pointer beam is transmitted to the receiving or remote location via a conventional telephone line.

At the receiving location the other laser pointer, equivalent to the pointer used at the transmitting location, is positioned in either a movable gimbal mount or used with appropriate mirrors so as to position the laser pointer spot on the viewgraph located at the receiving (remote) location in the appropriate position. The laser axis, or positioning mirrors are controlled by a microcomputer capable of receiving the telephone signal (through appropriate interface electronics) and translating it into signals which are capable of positioning the laser pointer so as to produce a laser spot accurately on the viewgraph at the receiving location.

It is therefore an object of this invention to provide a remote pointing system which can be utilized in conjunction with a viewgraph presentation at a remote location without the necessity of the presence of the briefer at the remote location and without in any way interfering with or altering the normal manner in which the presentation is delivered at the transmition location or seen at the remote (receiving) location.

It is another object of this invention to provide a remote pointing system which is capable of utilizing conventional telephone or voice lines for transmitting the signals associated therewith.

It is a further object of this invention to provide a remote pointing system which is economical to produce and which utilizes conventional, currently available components that lend themselves to standard mass producing, manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE PREFERRED EMBODIMENT

Figure 1:
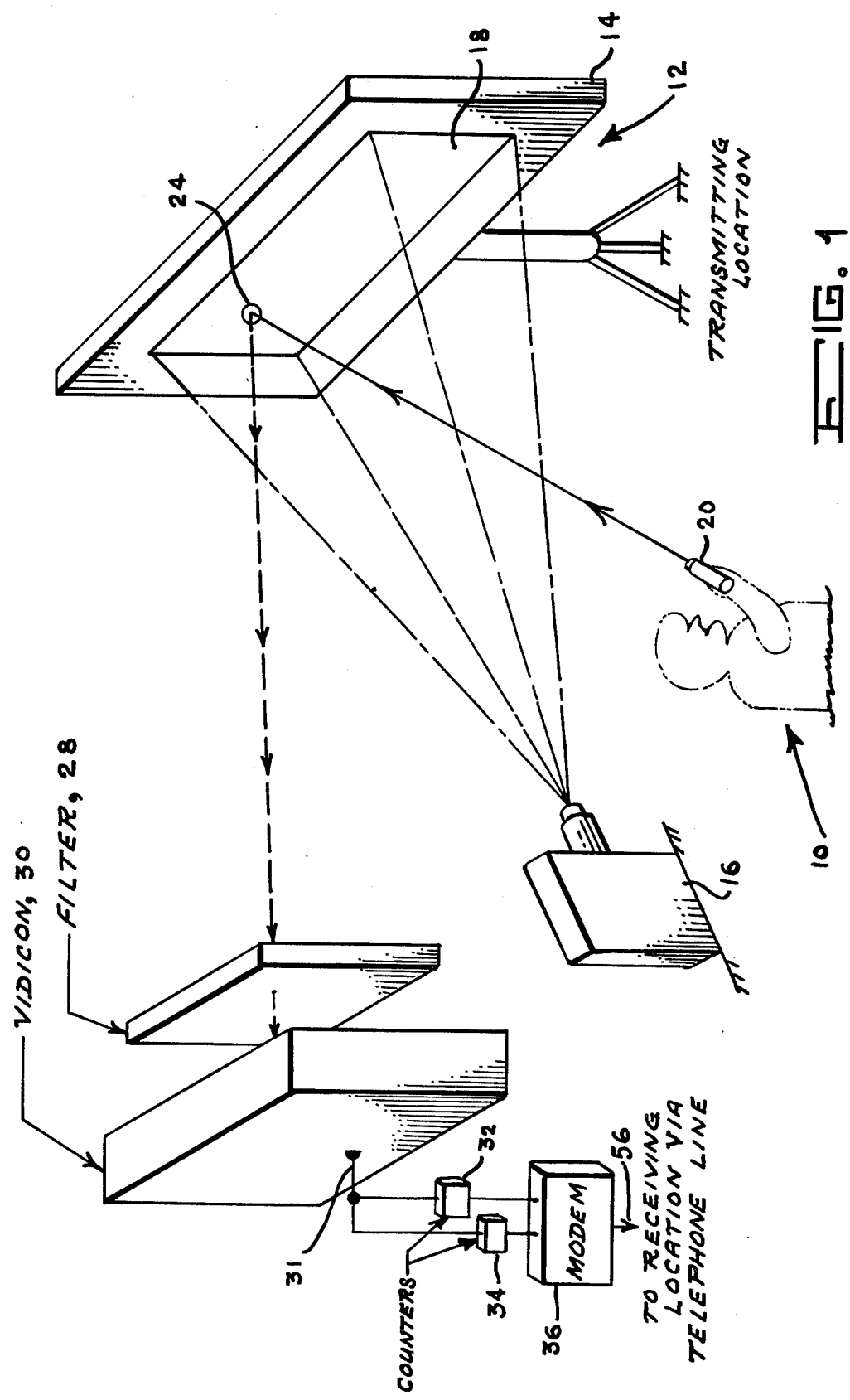
FIG. 1 is a pictorial representation of the pointer of the remote pointing system of this invention positioned at the transmitting location and utilized in conjunction with a viewgraph presentation.
Figure 2:
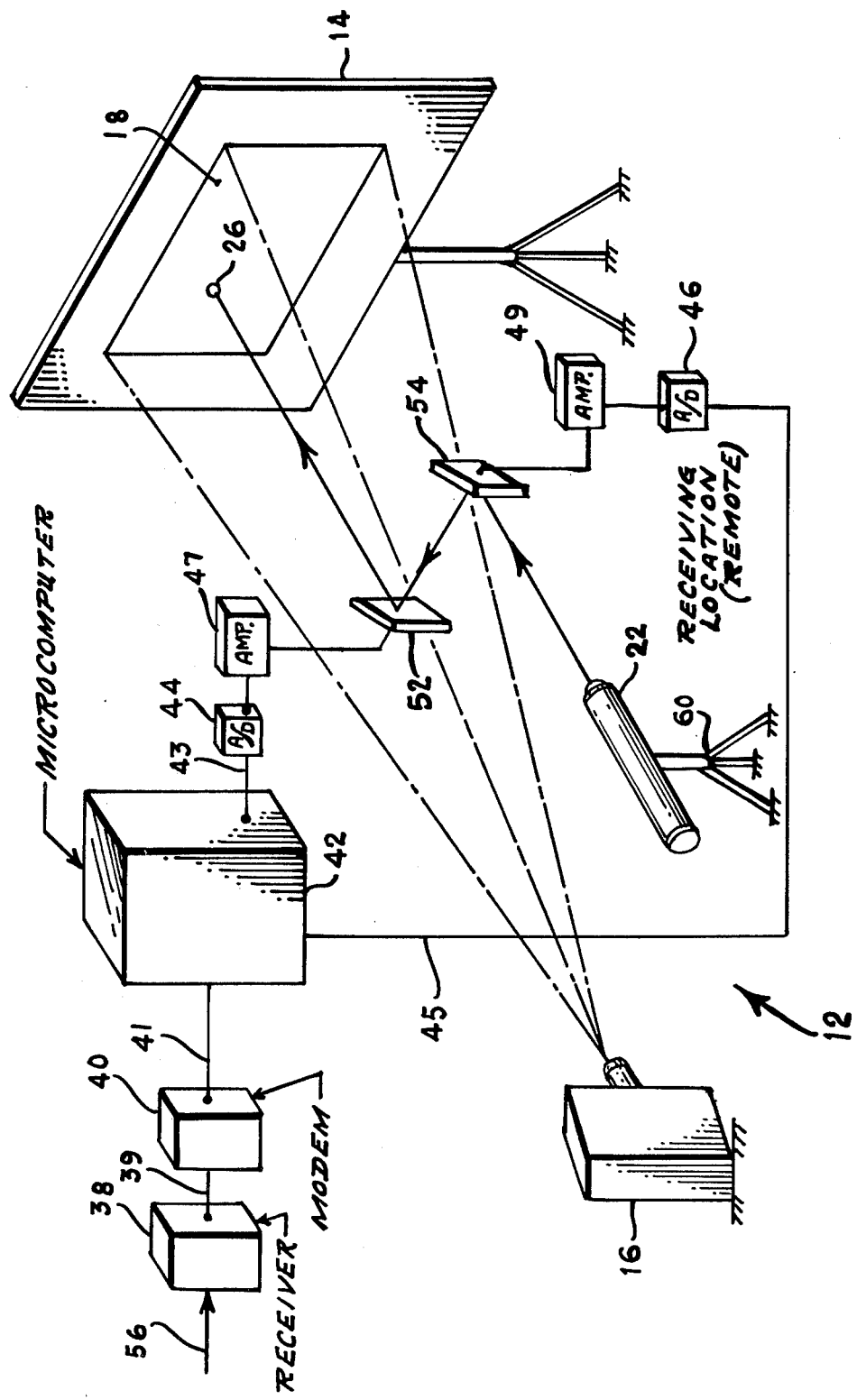
FIG. 2 is a pictorial representation of the pointer of the remote pointing system of this invention positioned at the receiving location during a viewgraph presentation.

Reference is now made to FIGS. 1 and 2 of the drawing. FIG. 1 pictorially represents the transmitting location at which an individual 10 acts as a briefer and FIG. 2 of the drawing pictorially represents the receiving or remote location with which the remote pointing system 12 of this invention is utilized. At each the transmitting and receiving locations, respectively, a screen 14 is set up in its proper relationship with an audience for viewing viewgraphs or the like. In addition, a pair of viewgraph projectors 16, one at each location, are utilized with screens 14 for projecting onto screen 14 the viewgraphs 18.

The remote pointing system 12 of this invention is made up of a first light emitting pointer 20 which briefer 10 utilizes at the transmitting location, a second light emitting pointer 22 located at the receiving location and the associated circuitry to be more fully described in detail hereinbelow.

Each pointer 20 and 22 is generally in the form of a conventional, handheld-type of helium-neon laser such as the Hughes Model 3221 H or 3021 H laser operating at a wavelength of 632.8 nm. The output of each pointer 20 and 22 is directed onto respective screens 14 in a similar manner to a conventional light pointer. Conventional optics are used to give a suitable size spot 24 and 26, respectively, on the viewgraphs 18 while a mask and conventional optics can be utilized, if desired, to form an arrow or other figure on the projection screen 14.

Figure 3:
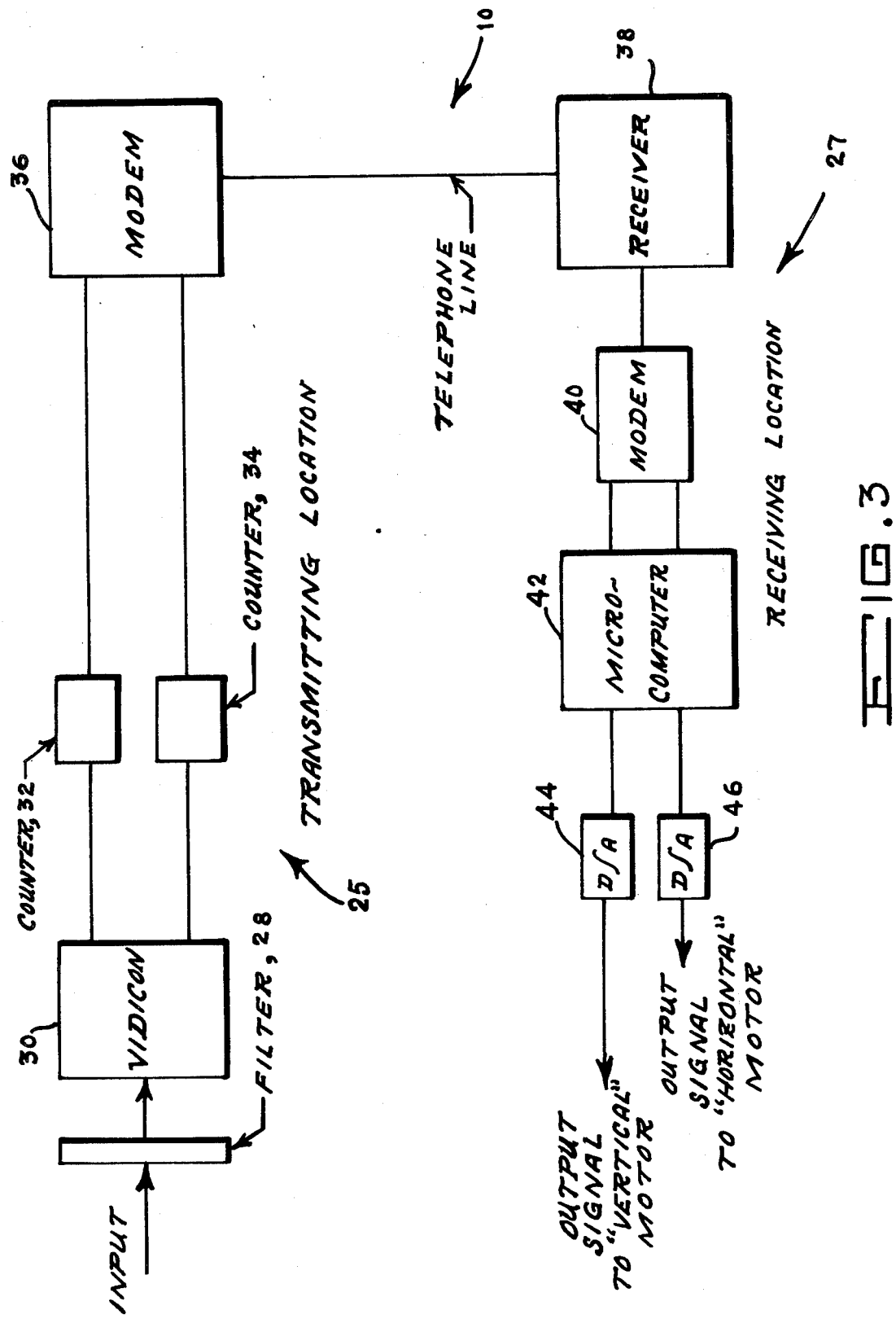
FIG. 3 is a schematic representation of the circuitry of remote pointing system of this invention.

The circuitry making up this invention is more fully described below and schematically illustrated in FIG. 3 of the drawing. Circuitry 25, located at the transmitting location, comprises an appropriate filter 28, a conventional TV camera such as a vidicon camera 30, a pair of conventional counters 32 and 34 and a conventional modem 36. The circuitry 27 located at the receiving location comprises a conventional telephone receiver 38, a conventional modem 40, a conventional microcomputer 42 and a pair of conventional analog to digital converters 44 and 46, respectively. As shown in FIG. 2 of the drawing a pair of conventional galvanometer-type deflectors (including mirrors) 52 and 54 of the type generally available from General Scanning Inc., Watertown, Mass., are operably connected to the output of converters 44 and 46. Although the particular elements set forth above provide an operative embodiment of the remote pointing system 12 of this invention, it should be realized that additional conventional elements may also be required or equivalent elements can be utilized within the scope of this invention. In addition, circuitry 25 located at the transmitting location and circuitry 27 located at the receiving location are interconnected by means of a conventional telephone line 56 or the like.

Referring once again to FIG. 1 of the drawing, the entire area of projection screen 14 is imaged onto the television or video camera 30. Filter 28 is optically interposed between vidicon camera 30 and the image on screen 14 in order to pass only a very narrow band of wavelengths therethrough, that is, the output wavelength of laser pointer 20, about 632.8 nm. Thus, the TV pickup, vidicon camera 30 will have a large video output signal 31 when its scan position is at the image of the helium neon laser pointer spot position 24.

Vertical and horizontal synchronizing pulses are taken from vidicon camera 30 directly or are stripped from the camera video output as in any conventional TV receiver (as described, for example, in A. Schure, "Basic Television", vol. 4 "TV Receiver Circuit Explanations", John F. Rider Inc. 1958). Conventional digital integrated circuit components, not shown, (as described, for example in "E. R. Hnatek", "A Users Handbook of Integrated Circuits", John Wiley & Sons, 1973) are used to reset and start the two conventional binary counters 32 and 34 on the first horizontal sync pulse following a vertical sync pulse, the latter being smoothed, again as in a conventional TV camera. One counter 32 counts horizontal sync pulses following the one that reset it. The other counter 34 is reset by each horizontal sync pulse and counts pulses from a conventional 4 MHz repetition rate pulse generator (not shown). Both counters 32 and 34 are stopped and the count held by the video signal caused by the helium neon laser spot image 24. A conventional discriminator circuit (not shown) is used to give a sharp video pulse close to the center of the spot. In the above manner counter 34 holds a number representing the horizontal position of spot 24 while the number in counter 32 represents the vertical position of spot 24.

Initially the TV camera or vidicon camera 30 is set up so that it images a slightly larger area (approximately 20% larger) than the area of a projected viewgraph 18 (slide, etc) to be used. In this way it is assured that the two numbers in counters 32 and 34 are less than 256 and can therefore be represented by 8 binary bits. This is so for the horizontal because there are 262.5 horizontal lines per TV scan field, so that a horizontal line lasts for 63.5 u sec. Consequently, there will be fewer than 254 pulses from the 4 MHz generator per scan line. The two eight bit numbers are sent over conventional telephone line 56 through a conventional modem 36, a modem being a device that performs modulation or demodulation in the form of a signal conversion, interfacing computers or computer peripheral equipment to the telephone line. If every 12th vertical sync pulse is used, then five pairs of eight bit numbers will be sent per second, a sufficient rate for the remote pointing system 12 of this invention. Even if a parity bit is included, a conventional 110 baud line can be used.

At the receiving location as shown in FIG. 2 of the drawing the input signal introduced by means of telephone line 56 is fed into any conventional telephone receiver 38. The signal 39 emanating from receiver must now be converted into a signal 41 which is acceptable to microcomputer 42. This is accomplished by means of any suitable converting device such as conventional modem 40 in a procedure reverse to the procedure performed by modem 36. Microcomputer 42 such as the LSI 11 microcomputer from Digital Equipment Corporation puts out two signals 43 and 45 in the form of 8 digit binary numbers at a suitable voltage level (e.g. 3 volts) into each of the two D/A converters 44 and 46.

Also at the receiving location as shown in FIG. 2 of the drawing the second helium neon laser is used as pointer 22 with suitable focusing optics (not shown) to control the size of spot 26. Pointer 22 is mounted in any suitable mount 60 with appropriate deflectors in the form of adjustable mirrors 52 and 54 utilized to control the X-Y (horizontal and vertical) axis of spot 26 on viewgraph 18. If desired, however, the mirrors 52 and 54 may be eliminated and the laser pointer 22 mounted in a conventional gimbal mount with suitable positioning motors. The output of each D/A converter 44 and 46, respectively, is amplified with one driving the X-axis deflector or mirror 52 and the other the Y-axis deflector or mirror 54.

For the operating sequence of the remote pointing system 12 of this invention reference is once again made to FIGS. 1 and 2. During such an operation it is first necessary for the briefer 10 to send by any suitable means one set of a pair of identical sets of viewgraphs 18 to the remote location (receiving location) where the briefing session is to be held. It is essential that the viewgraphs 18 at both the location of briefer 10 (the transmitting location) and the remote location (the receiving location) be shown simultaneously. The briefer's oral presentation, including instructions to change the viewgraph (using buzzers, tones, or verbal instruction) are conveyed to the receiving location by way of a conventional telephone conference call hookup. The pointer spots 24 and 26 at the transmitting and receiving stations are maintained at the same place on viewgraphs 18 by keeping all viewgraphs 18 at each location at the same position on each screen 14, for example, by using reference marks on the projectors 16 or screens 14.

An initializing procedure is used with this invention to synchronize pointer spots 24 and 26 at each location before the briefing can begin or it can be repeated if necessary during or between briefings. The initializing procedure begins by focusing the transmitting pointer 20 at the upper left and lower right hand corners of viewgraph 18 on screen 14. The operator (not shown) at the receiving location, upon being told over the conference line that the upper left is being pointed to, enters, according to a suitable microcomputer program, a code on the keyboard of microcomputer 42, for example, UL. Microcomputer 42 then stores the received two eight bit binary numbers ($X_U$, $Y_U$) in memory. The same procedure is carried out to store in other memory locations the number ($X_L$, $Y_L$) associated with the lower right.

At the receiving location an appropriate program is written such that a code for upper left, for example, ULR, entered on the keybroad causes microcomputer 42 to put out all zeros into D/A converters 44 and 46, respectively. The X and Y deflectors or mirrors 52 and 54 are adjusted so that the laser spot 26 falls upon the upper left hand corner of the viewgraph image on screen 14. Another code into microcomputer 42, for example, LRR, causes all ones in each binary number (binary 255) to be output to D/A converters 44 and 46, respectively. The output of D/A converters 44 and 46 is fed into amplifiers 47 and 49 associated with each deflector 52 and 54, respectively. The gain in each amplifier 47 and 49 is now adjusted so that the laser spot appears in the lower right hand corner. This initiating procedure is similar in nature to the procedure used with conventional desktop computer X-Y plotters (such as the Hewlett Packard Model 9825 computer, model 9872A plotter) to initialize to and refer all corrdinate points to the paper size and position. Such a procedure corresponds to the viewgraph magnification and location on screen 14.

The system is now ready for operation. In actual operation, the microcomputer 42 receives two eight bit binary numbers, as described above, for example, (X, Y). It then computes two new numbers ($\overline{X}$, $\overline{Y}$) which it outputs to D/A converters 44 and 46. The numbers ($\overline{X}$, $\overline{Y}$) are defined by $$[\overline{X}, \overline{Y}] = \left[ \frac{(X - X_U)}{X_L}(255); \frac{Y - Y_U}{Y_L}(255) \right]$$

with each number rounded off to the nearest integer. It is then possible for a briefer 10 at one location to transmit by means of the remote pointing system 12 of this invention the position spot 24 of pointer 20 to a remote location for use with a viewgraph 18 at the remote location. Any movement of pointer 20 is relayed by way of telephone line 56 to pointer 22 for similar movement thereof. Consequently, the briefing session can be performed at the remote location without the actual physical presence of briefer 10.

Although this invention has been described with reference to a particular embodiment, it will be understood to those skilled in the art that this invention is also capable of further and other embodiments within the spirit and scope of the appended claims.

I claim:

1. A remote pointing system comprising first means situated at a preselected location for emitting a visible beam of radiant energy of preselected wavelength, first means having a preselected configuration located adjacent said first beam emitting means for displaying thereon said visible beam of radiant energy and allowing further transmission of said visible beam of radiant energy, means in optical alignment with said beam of radiant energy transmitted from said first display means for receiving only said preselected wavelength of said beam of radiant energy and transmitting a signal capable of transmission over a telephone line corresponding to the position of said beam of radiant energy on said first display means, said receiving and telephone line transmission signal transmitting means including a video camera in optical alignment with said beam of radiant energy transmitted from said first display means and means operably connected to said video camera for converting a signal emanating from said video camera into said signal capable of transmission over said telephone line, means situated at a location other than said preselected location for receiving said telephone line transmission signal corresponding to the position of said beam of radiant energy on said first display means and transmitting a signal in accordance therewith, second means situated at said other location for emitting a visible beam of radiant energy, second means having a preselected configuration located adjacent said second beam emitting means for displaying said visible beam of radiant energy emitted therefrom, means operably connected to said position signal receiving and transmitting means at said other location for directing said beam of radiation emitted from said second beam emitting means onto said second display means in accordance with said position signal whereby the position of said beam of radiant energy on said second display means corresponds to the position of said beam of radiant energy on said first display means.

2. A remote pointing system as defined in claim 1 wherein said means at said other location for receiving and transmitting said signal corresponding to the position of said beam of radiant energy on said first display means comprises a telephone receiver for receiving said telephone line transmission signal, means operably connected to said telephone receiver for converting said telephone line transmission signal into a digital signal, means operably connected to said means for converting said telephone line transmission signal into said digital signal for processing said digital signal and providing a pair of digital output signals representative of the position of said beam of radiant energy on said first display means and means operably connected to said processing means for converting said pair of digital output signals into a pair of analog output signals for use with said directing means.

3. A remote pointing system as defined in claim 2 further comprising means operably interposed between said video camera and said means for converting a signal into a signal capable of transmission over a telephone line for providing a signal representing the horizontal and a signal representing the vertical position of said beam of radiant energy on said first display means.

4. A remote pointing system as defined in claim 3 wherein said directing means comprises a first adjustable mirror and a second adjustable mirror, means operably connected between said digital to analog converting means and said first and second mirrors for adjusting said mirrors in accordance with the pair of analog output signals.

5. A remote pointing system as defined in claim 4 wherein said receiving and telephone line transmission signal transmitting means further comprises means optically aligned with said first beam of radiant energy transmitted from said first display means and interposed between said first display means and said video camera for allowing only said preselected wavelength of radiation to be received by said video camera.

6. A remote pointing system as defined in claim 5 wherein said video camera is a television camera.

7. A remote pointing system as defined in claim 6 wherein said first and second beam emitting means are both in the form of lasers.

8. A remote pointing system as defined in claim 7 wherein said means for converting a signal into a signal capable of transmission over said telephone line and said means for converting said telephone signal into a digital signal are both modems.

9. A remote pointing system as defined in claim 8 wherein said means for providing horizontal and vertical position signals are a pair of counters.

* * * * *